Aug. 4, 1942.  G. L. SMITH  2,292,017
BRAKE ADJUSTER
Filed Sept. 26, 1940

INVENTOR.
GEORGE L. SMITH.
BY
Blair & Kilcoyne
ATTORNEYS.

Patented Aug. 4, 1942

2,292,017

UNITED STATES PATENT OFFICE 2,292,017

BRAKE ADJUSTER

George L. Smith, Washington, D. C., assignor to Thermo Brakes Corporation, Washington, D. C., a corporation of Virginia Application September 26, 1940, Serial No. 358,545

9 Claims. (Cl. 188—79.5)

My invention relates to adjusting mechanisms for internal expanding brakes.

Brakes now in general use on motor vehicles require periodic adjustment to take up for wear of the brake lining, and this adjustment is generally made by a mechanic skilled in brake work. Means is provided by the manufacturer to effect such adjustment and consists of cams, eccentrics, adjusting screws or bolts. On the rear brakes of motor vehicles there is generally provided a mechanical brake setting device to be used in an emergency, should the regular brake setting mechanism fail to operate, and this device must also be adjusted from time to time by re-setting the mechanical hand operable means provided.

Also the internal expanding brake now almost universally used, when heated up by heavy brake application, expands away from the brake shoes causing additional movement of the brake setting device to follow up this expansion. Consequently any ordinary automatic take-up device to compensate for brake lining wear would operate to compensate for drum expansion also, with the result that the running clearance would be seriously reduced when the drum had cooled off. It is therefore necessary to prevent this adjustment when the drum is hot.

Brakes in general use also have centralizing devices to position the brake shoes free of the drum when brakes are off. I have found that, for the type of brake shown in the appended drawing, this device can be dispensed with by cross connecting the two shoes in such a way that they are free to swing together about their anchor pins and centralize themselves. This tends towards simplification and a reduction in cost of the brake.

It is therefore one of the objects of this invention to provide brake adjusting means which will be automatic, requiring no skilled mechanic to operate it.

A further object is to provide for automatic adjustment of both service and emergency brake setting mechanisms by one and the same means, thus simplifying the mechanism.

A further object is to provide adjusting means which will completely replace any hand adjusting means and to make this means so simple that its cost will not appreciably exceed the cost of the hand adjusting means which is replaced thereby.

A further additional object is to incorporate in my adjusting means thermostatic controlling mechanism which will prevent any over adjustment of the brake which would otherwise result from expansion of the brake drums caused by heat; and a further object, resulting from this thermostatic control, is the reduction of the brake pedal movement required when hand adjustment is made at infrequent intervals.

A further object of this invention is to provide a floating friction element that is free to centralize itself in its brake drum when not applied, by the use of the same simple parts which effect the other objects outlined above.

Other objects will be in part obvious from the annexed drawing, and in part hereinafter indicated in connection therewith by the following analysis of this invention.

This invention accordingly consists in the features of construction, combination of parts and in the unique relation of the members and in the relative proportioning and disposition thereof, all as more completely outlined herein.

To enable others skilled in the art fully to comprehend the underlying features of this invention, that they may embody the same by the modifications in structure and relation contemplated thereby, a drawing depicting a preferred form of the invention has been annexed as part of this disclosure, and in such drawing like characters of reference denote corresponding parts throughout all of the views, in which—

Figure 1:
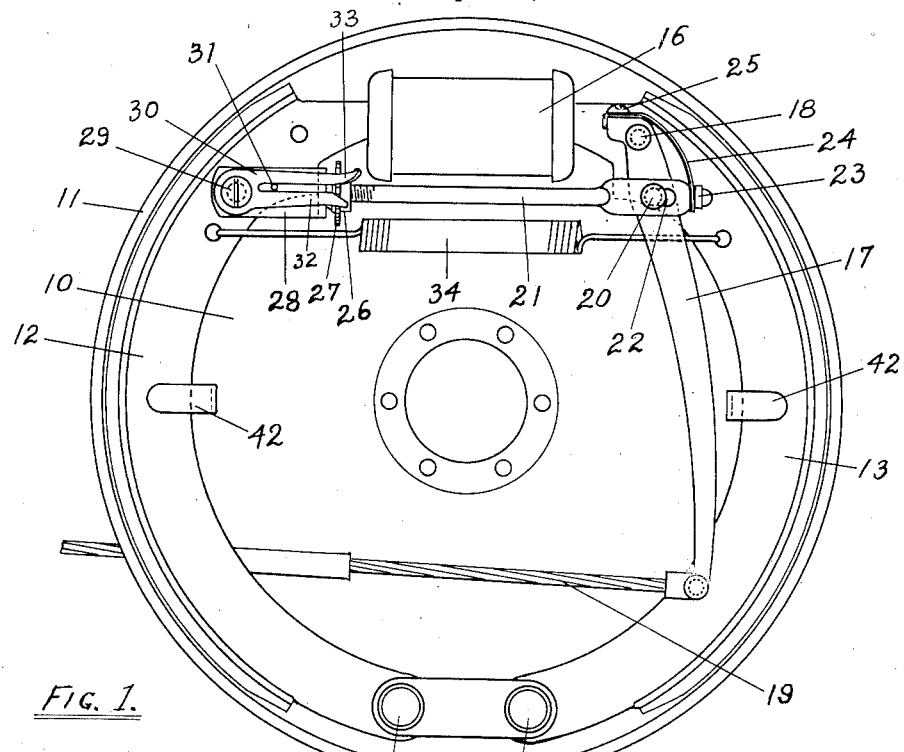
Fig. 1 is a side elevation of a left rear brake with drum head removed.

Referring now to the drawing in detail and more particularly to Fig. 1, 10 represents a brake support plate adapted to be secured to an axle housing, and 11 the brake drum carried by a rotating wheel. 12 and 13 are brake shoes pivoted at 14 and 15 to the plate 10. A conventional type of wheel cylinder is shown at 16 for expanding the shoes into the drum by hydraulic pressure.

A hand or emergency brake lever 17 is pivotally connected by the pivot 18 to the shoe 13, and has connected to its lower end the brake operating wire 19. A pin 20 connects the link 21 to lever 17 by passing through an elongated hole 22 in link 21, thereby producing a lost motion connection between the lever and link. The right end of link 21 has a toe 23 turned up at right angles and acts as an abutment for the free end of a thermostatic spring 24 secured to lever 17 by the screw 25. Provided the brake is cool, this spring exerts sufficient pressure on the toe 23 to prevent any movement of pin 20 in the elongated hole 22 as the brake shoe 13 swings to the right into contact with the drum 11 and carries the upper end of the lever 17 with it. But, as the brake heats up, this spring is so mounted that its pressure reduces and finally becomes zero at about 100° F. When this point is reached the spring 24 actually begins to move away from toe 23 and therefore exerts no force on the link to move it to the right. Lost motion is thus introduced between the shoe 13 and link 21 by way of the lever 17 and elongated hole 22.

The left end of link 21 is threaded to receive the hub 26 of the ratchet wheel 27. The hub seats in a hole in the end of the bracket 28 which is secured by the machine screw 29 to the web of shoe 12. This screw also holds the spring pawl 30 in place and a small pin 31 in bracket 28 keeps the pawl from turning on the screw 29.

The pawl 30 is a double one having a driving toe 32 to rotate the ratchet wheel 27 and a retaining toe 33 to keep this wheel from turning backward. To complete the assembly the usual brake release spring 34 cross connects the free ends of shoes 12 and 13 and exerts a compressive stress on the link or spacer 21.

Figure 2:
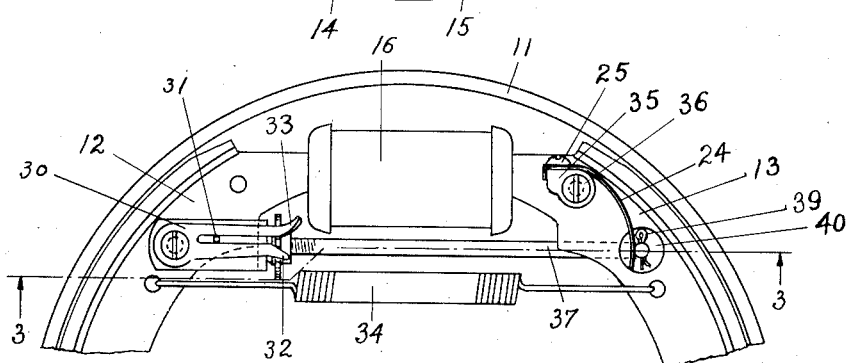
Fig. 2 is a partial side elevation of a front brake.
Figure 3:
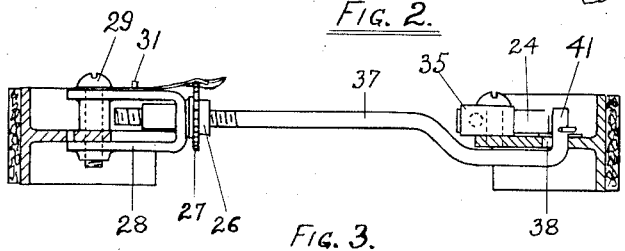
Fig. 3 is a sectional view on line 3—3 of Fig. 2.

Fig. 2 illustrates the front wheel construction which has no hand operating mechanism. A round steel rod 37 threaded to take the hub 26 is bent to enter the elongated hole 38 in the web of shoe 13 and forms a lost motion connection with it as the hole is longer than the diameter of the rod 37. It is held in position by the cotter pin 39 and washer 40.

In place of the lever 17 I secure a block 35 to shoe 13 by means of bolt 36 in pivot hole 18. This block acts as a support for the thermostatic spring 24 which is secured to it by the screw 25. This spring bears against the end 41 of link 37 and is set to produce the same action as that described for the rear brake, namely, the introduction of lost motion between the shoe 13 and the link 37 when the brake is hot.

The mechanism operates as follows—

For hand operation,—see Fig. 1,—lever 17 is swung about its pivot 18 by the pull wire 19 and the pin 20 exerts pressure on the left end of slot 22, forcing link 21 to the left. The link in turn forces hub 26 against its seat in bracket 28 secured to shoe 12 with the result that the free ends of the shoes 12 and 13 are separated and forced against the drum 11.

For foot operation the pistons—not shown—in the hydraulic cylinders 16 separate these free ends of the shoes and the links 21 and 37 under the pressure of the thermostatic springs 24 are pulled away from the brackets 28, provided the brakes are cold. This pulls the hubs 26 to the right in Figs. 1 and 2. If this movement is sufficient, the slope of the driving pawl 32 will cause it to drop behind the next tooth on the wheel 27 as backward rotation of this wheel is prevented by the retaining pawl 33. When the brake is released the new tooth engaged by 32 slides down its inclined face and the wheel is rotated, screwing out on hub 26 and lengthening the spacers or links 21 and 37 so that the retractive movement of the shoes is reduced.

Thus it is evident that the retractive movement of the shoes is controlled by these links, and that the take-up action depends upon the slope of the driving pawl 32 so that it is possible for the designer to fix the running clearances of the brakes at any figure he may desire by providing the proper slope on the end of driving pawl 32. Also it is evident that heating of the brake above a predetermined temperature such as 100° F. will cause the thermostatic springs 24 to reduce their pressure on the toe 23 and the end 41 to the point where these springs are no longer completely effective to move the links 21 and 37. At this point the relative movement between the ratchet wheel 27 and the pawl 30 produced by separation of the upper ends of the shoes as a result of hydraulic brake application starts to shorten, thereby introducing a delay in and eventually a complete interruption of the take-up action between the ratchet wheel and its pawl.

Spring pawl 30 exerts a pressure on the ratchet wheel 27 which causes a frictional resistance to the sliding movement of the hub 26 out of its bearing in bracket 28 and this is desirable as vibration of the wheel, when the brake is applied might otherwise cause the links 21 or 37 to jar to the position where a new tooth would be picked up by pawl 32 when the thermostatic spring 24 is bent by heat to avoid just such a pick-up. Normally the operation of the brakes will produce a reciprocating movement of the ratchet wheel away from the bracket 28 and back again without causing any adjusting action, as this movement will not be sufficient to cause the driving pawl 32 to pick up a new ratchet tooth. When it is sufficient to do this, the complete adjusting operation consists of first the arming of the adjuster by the engagement of a new tooth on the outward movement of the ratchet wheel from its seat in the bracket 28 and, second, the rotation of the wheel through an angle subtended by one tooth upon the return movement of the ratchet wheel hub into its seat in the bracket.

It will be noted also that the shoes are not prevented from rotating a slight amount on their anchor pins 14 and 15 when brake is released. This movement is of course arrested by the drum so that the running clearance between one shoe and the drum might be zero while that between the other shoe and the drum would be twice its normal amount. This swinging movement which might cause first one shoe and then the other to chafe the drum is resisted by the friction of the brake parts such as that of the pistons in the cylinders 16 and anti-rattle devices 42 usually provided to frictionally hold the shoes in position. Thus the shoes float inside the drum and centre themselves when the brakes are off.

While this invention has been described in connection with a conventional type of automobile brake, the principles involved are susceptible of various modifications which would be apparent to anyone skilled in the art. The invention is, therefore, to be limited only as indicated by the scope of the appended claims.

I claim:

1. In a hydraulically operated two shoe internal expanding brake the combination of means for mechanically operating said brake comprising a lever pivoted to one of said shoes, an automatically adjustable link connecting said lever with the other shoe, and thermostatic means responsive to the temperature of the brake controlling the adjustment of said link.

2. An automatic brake adjuster for internal expanding brakes having two shoes mounted on fixed pivots at adjacent ends, and a tension spring connecting the free ends of said shoes, the combination of a spacer link having an adjustable connection with the free end of one shoe and a lost motion connection with the free end of the other shoe, and a thermostatic spring taking up said lost motion for temperatures below a predetermined figure and permitting lost motion for temperatures above said figure.

3. In an internal two shoe expanding hydraulic brake an automatic brake adjusting mechanism to compensate for wear of the brake lining comprising a spacer inter-connecting the movable ends of said shoes said spacer having a lost motion connection to one shoe with a thermostatic spring responsive to the temperature of the brake controlling the amount of said lost motion and an automatically extensible connection with the other shoe.

4. An automatic brake adjuster for internal expanding brakes having two shoes mounted on fixed pivots at adjacent ends, and a tension spring connecting the free ends of said shoes, the combination of a spacer link having a lost motion connection with the free end of one shoe and a thermostatic spring taking up said lost motion for temperatures below a predetermined figure and permitting lost motion for temperatures above said figure, a bracket carried by the free end of the other shoe, a ratchet wheel having a hub engaging a screw threaded portion of said spacer link and rotatably and slidably mounted in said bracket, and a spring pawl secured to said bracket engaging the teeth of said ratchet wheel to operate it and applying a frictional resistance to sliding movement of said hub out of said bracket.

5. In an internal two shoe expanding and contracting hydraulic brake an automatic brake adjusting mechanism to compensate for wear of the brake lining, comprising a spacer inter-connecting the movable ends of said shoes, said spacer having a lost motion connection to one shoe with a thermostatic spring responsive to the temperature of the brake controlling the amount of said lost motion and an automatically extensible connection with the other shoe armed for extension by the expanding movement of the shoes and extended by their contracting movement.

6. In an hydraulically operated two shoe internal expanding brake the combination of means for mechanicaly operating said brake comprising a lever pivoted to one of said shoes, a brake release spring and an automatically adjustable link connecting said lever with the other shoe, said link being armed for adjustment by hydraulic application of the brake and adjusted by said release spring.

7. In an automatic brake adjusting mechanism a ratchet wheel having reciprocating movement in the direction of its axis and a double arm ratchet pawl engaging two teeth of said wheel, the engaging surface of one arm being substantially parallel to said reciprocating-movement and the engaging surface of the other arm being inclined at an angle with said movement.

8. In an internal expanding and contracting two shoe hydraulically actuated brake, including a mechanical brake applying lever mounted on and movable with one shoe when said brake is hydraulically applied, the combination of a link connected to said lever and to the other shoe by means of an automatically adjustable device, and acting as a spacer limiting the combined contracting movement of said shoes, and thermostatic control means associated with said link to delay automatic adjustment thereof upon a rise in temperature of said brake resulting from its hydraulic actuation.

9. In an automatically adjustable two shoe hydraulically operated brake including a mechanical brake applying lever mounted on and movable with one shoe when said brake is hydraulically applied, the combination of a link having an automatically adjustable connection with the other shoe and a lost motion connection with said lever, and thermostatic means mounted on said lever and controlling the amount of said lost motion when said brake is hydraulically applied.

GEORGE L. SMITH.